Jan. 12, 1965   L. HITCHCOCK, JR., ETAL   3,165,355
UNIVERSAL-FIT ACCELERATION PROTECTIVE DEVICE
Filed July 30, 1963   3 Sheets-Sheet 1
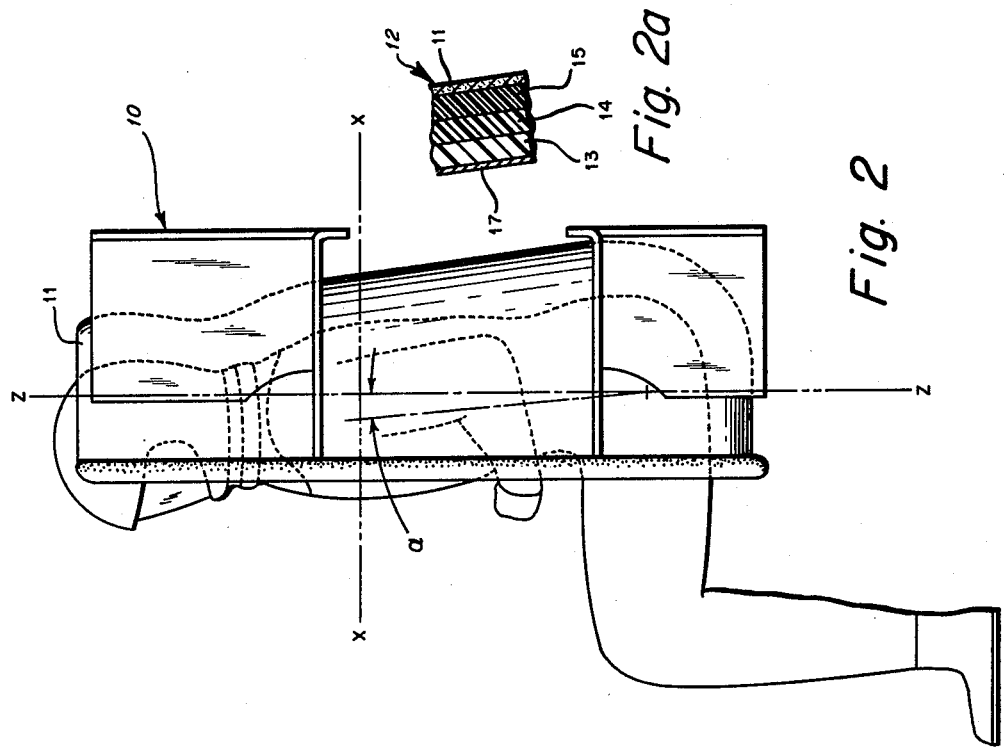
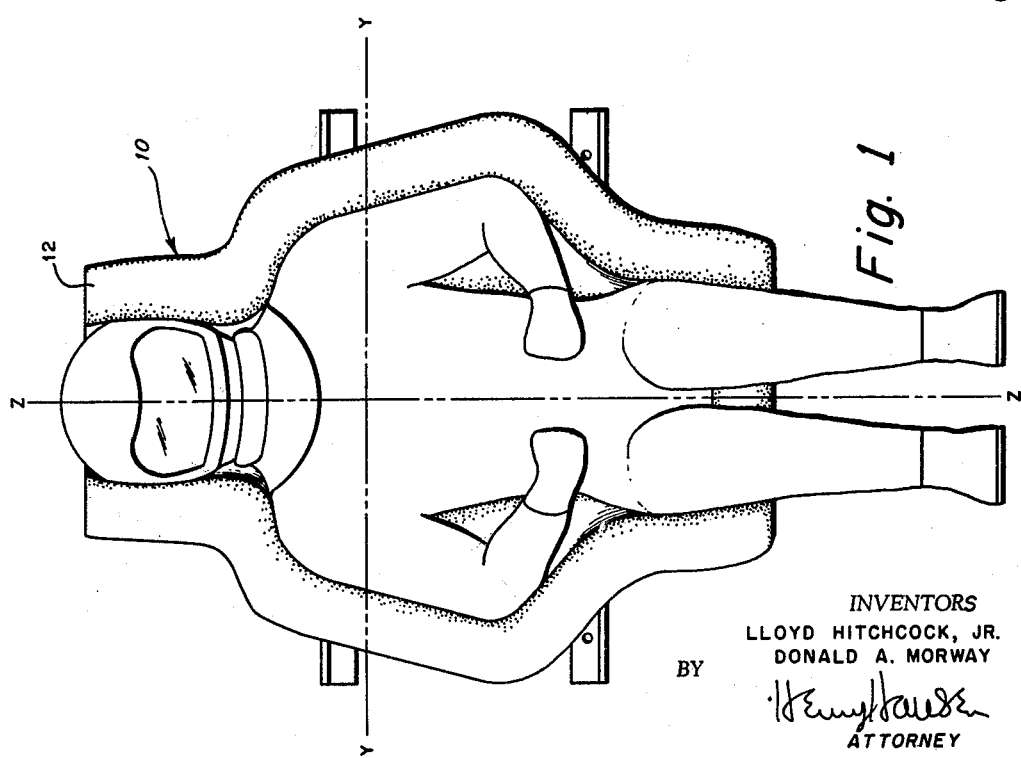
INVENTORS
LLOYD HITCHCOCK, JR.
DONALD A. MORWAY
BY
ATTORNEY Jan. 12, 1965 L. HITCHCOCK, JR., ETAL 3,165,355
UNIVERSAL-FIT ACCELERATION PROTECTIVE DEVICE
Filed July 30, 1963 3 Sheets-Sheet 2

INVENTORS
LLOYD HITCHCOCK, JR.
DONALD A. MORWAY
BY
ATTORNEY

United States Patent Office 3,165,355
Patented Jan. 12, 1965

3,165,355
UNIVERSAL-FIT ACCELERATION PROTECTIVE
DEVICE
Lloyd Hitchcock, Jr., Hatboro, and Donald A. Morway, Oreland, Pa., assignors to the United States of America as represented by the Secretary of the Navy
Filed July 30, 1963, Ser. No. 298,862
3 Claims. (Cl. 297—216)
(Granted under Title 35, U.S. Code (1952), sec. 266)

The invention described herein may be manufactured and used by or for the Government of the Unites States of America for governmental purposes without the payment of any royalties thereon or therefor.

The present invention relates to body support and restraint apparatus, and more particularly to a universal-fit acceleration protective contoured couch suitable for use by a human occupant subjected to high acceleration environment, the occupant being from a group comprising a wide range of physical sizes and configurations.

Vehicles presently used in modern aeronautical and space flights are subjecting man to increasingly higher acceleration environments inimical to his endurance and tolerance. The so-called Mercury couch was one major innovation used by pilots to adapt to these new environments. Heretofore, such couches were usually constructed of rigid materials custom-molded to conform to an individual pilot's body size and configuration. Therefore it was necessary to install and remove a couch from the aero-space vehicle each time there was a change in pilot. The prior art couches were also limited in application to substantially transverse or so-called "eyeballs in" acceleration wherein the acceleration force vector is directed front-to-back on the pilot. Little if no body support and restraint was provided against longitudinal or "eyeballs up and down" acceleration and lateral "eyeballs left and right" acceleration.

Accordingly, it is an object of the present invention to provide a universal-fit acceleration protective contoured couch which provides support and restraint for man within high acceleration environment, and which is suitable without modifications for a wide range of physical sizes and configurations in man.

Another object of the invention is to provide a contoured couch which will firmly accept a pilot from a wide range of physical sizes and configurations and still provide comfort and resilient support well beyond his point of maximum physiological tolerance to high accelerations.

Still another object of the invention is to provide a resilient-lined, contoured couch in which the wide variations in compressive load concentration resulting from physical protrusions of the occupant subjected to high acceleration are absorbed with only slight variations in couch deformation, and in which overall acceleration loading is distributed over all of the supported body members with a relatively small stress gradient.

A further object of the invention is to provide a universal-fit contoured couch which is especially useful in aero-space flights, which is relatively simple and inexpensive to manufacture, lightweight, and suitable for a wide variety of support and restraint applications arising in both military and civilian activities.

Various other objects and advantages will appear from the following description of one embodiment of the invention, and the most novel features will be particularly pointed out hereinafter in connection with the appended claims.

In the drawings:

FIG. 1 represents a front view of one embodiment of the invention with an occupant supported and restrained therein;

FIG. 2 represents a side view of the embodiment shown in FIG. 1;

FIG. 2a represents an enlarged fragmentary cross-section of the embodiment of FIG. 1;

Figure 3:
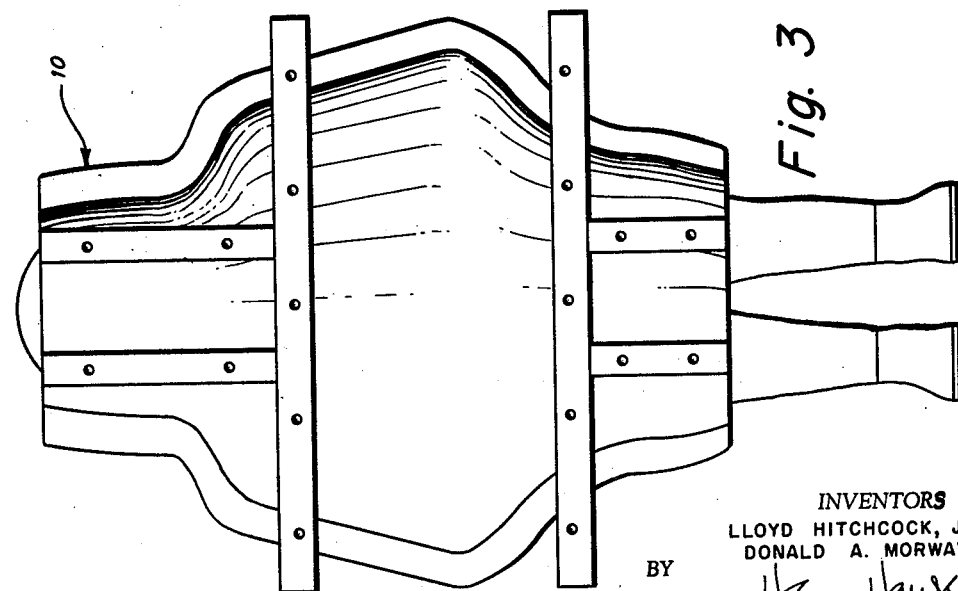
FIG. 3 represents a rear view of the embodiment shown in FIG. 1.

In the illustrated embodiment of the invention, a couch, generally indicated by the numeral 10 in FIGS. 1, 2 and 3, is shown supporting an occupant from the buttock to his head. The posture of the occupant is best described in relation to a longitudinal axis Z. The occupant's pelvis is positioned in the couch 10 so that the Z-axis passes approximately through the upper pivotal joint of the femur or thigh bone. With the femur approximately normal to the Z-axis, the occupant's torso and head are leaned slightly forward from the pelvis so that his spine and the Z-axis subtend a so-called back angle $\alpha$ of approximately 5 degrees. His legs are bent at the knees as desired, however, it is contemplated that the couch 10 may be extended below the pelvis to support and restrain the legs as well. For sign convention, a positive longitudinally applied acceleration force, or "eyeballs down" is parallel to the Z-axis and directed from the buttock to the head. Transversely applied acceleration forces are resolved into X and Y components parallel to orthogonally disposed X- and Y-axes. Positive applied acceleration forces on the X- and Y-axes are respectively directed front-to-back, and left-to-right of the occupant, or "eyeballs in" and "eyeballs left." Obviously the present invention is not intended to support the occupant against negative applied acceleration forces parallel to the X-axis. The latter forces are avoided by proper orientation of the occupant and couch 10 in the vehicle.

Figure 4A:
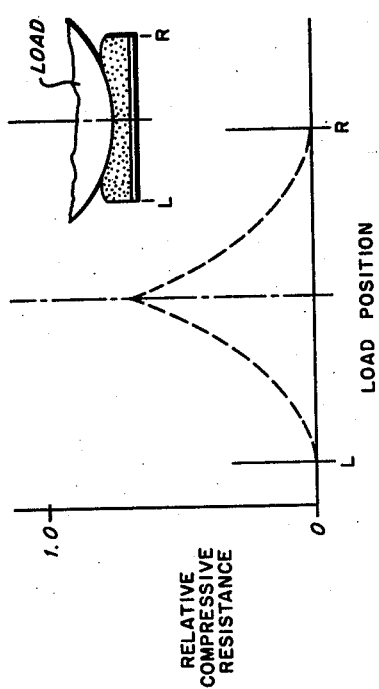
FIGS. 4a and 4b are schematic and graphical illustrations for comparing the load distribution of the prior art and the present invention.
Figure 4B:
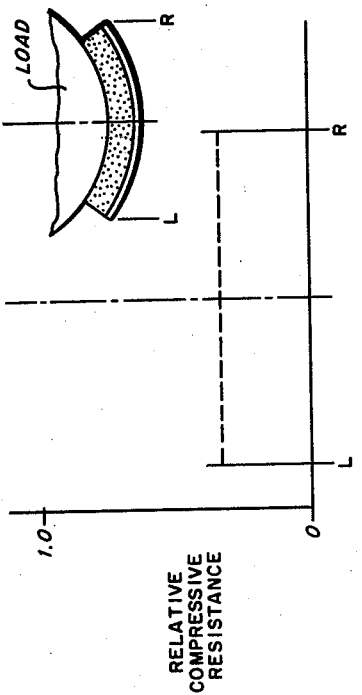

The couch 10 comprises a rigid shell 11 substantially contoured into a hollow relief of the head, back and posterior of the occupant in the posture described hereinabove. The shell 11 is of sufficient depth so as to provide complete support, laterally and longitudinally, to the occupant. The relief formed by the shell 11 is uniformly larger than corresponding body portions of the occupant by an amount sufficient for juxtapositioning a resilient pad 12 over the entire relief surface of the shell 11. The pad 12 is substantially of constant thickness and thereby provides a contiguous support to the confronting body portions of the occupant. With this particular configuration, an additional function obtains over the prior art as shown in FIGS. 4a and 4b. It can be seen in FIG. 4a that when a contoured load is placed on a resilient pad with a rigid flat backing, the compressive resistance under the protruding portion of the load is higher than at adjacent points. Thus, the load is supported across only slightly diffused fulcrums of high stress concentrations. At high accelerations, these stresses become unbearable to man. In contrast, resilient padding on the rigid contoured backing of the present invention in FIG. 4b distributes the compressive resistance evenly over the entire load. High stress concentrations have been removed.

The structural composition of the pad 12 is best described with reference to the circular inset of FIG. 2 wherein a fragmentary cross-section of the pad 12 is illustrated. The pad 12 is comprised of a plurality of resilient layers 13, 14 and 15 contiguously secured to each other and to the inner surface of the rigid shell 11. The layer 15 being next to the shell 11 and layer 14 between layers 13 and 15. A slip lining 17, having omnidirectional elastic characteristics, may be secured to the otherwise exposed surface of the layer 13 to permit slipping as the pad 12 complies to the occupant's shape, and further to prevent the pad from scuffing.

The three layers 13, 14 and 15 are of approximately the same thickness and are secured together in any convenient manner. It is desirable that their interfaces be air-permeable to insure optimum deformation characteristics. For example, a porous bonding material may be used or the layers may be fused together and in place by well-known foaming techniques using foams such as elastomeric urethanes. Each resilient layer has a distinctly different elastic bulk modulus: layer 15 having the highest modulus and hence the least compressibility, and layer 13 has the lowest modulus and the most compressibility. The middle layer 14 is of intermediate compressibility. With this arrangement, the layer 13 is primarily active to yield and conform to the specific body shape of an occupant, and the layer 15 is most active to insure a residual resilience in the pad 12 under the highest expected accelerations and stress concentrations. Absent the layer 15, the pad 12 may experience what is known as "bottoming-out." This term refers to the undesirable condition resulting when all of the elastic deformation has been used and further reaction forces are obtained directly from the rigid shell 11.

Figure 5:
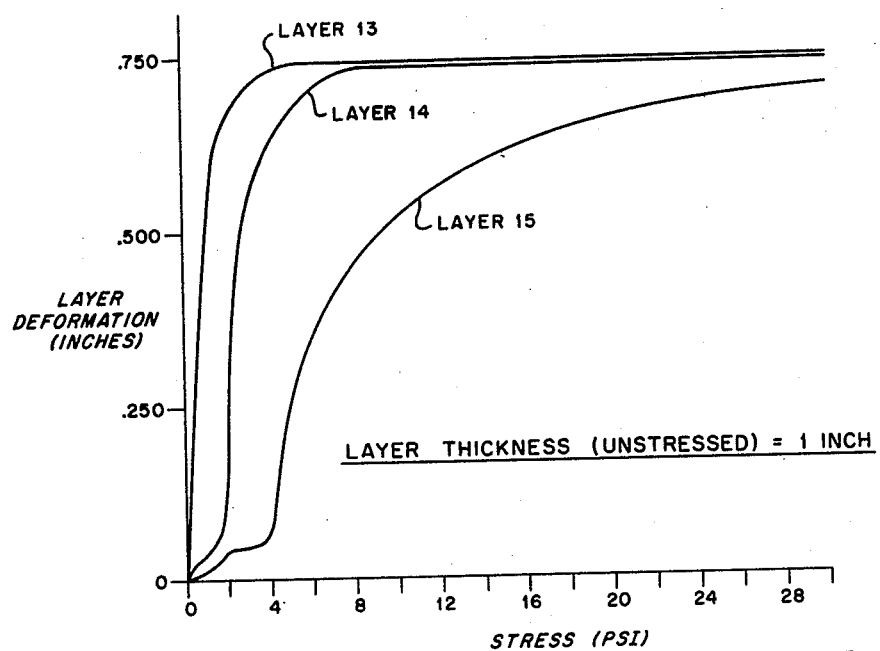
FIG. 5 is a graphical representation of the stress vs. deformation properties for exemplary elastic materials used in the present invention.
Figure 6:
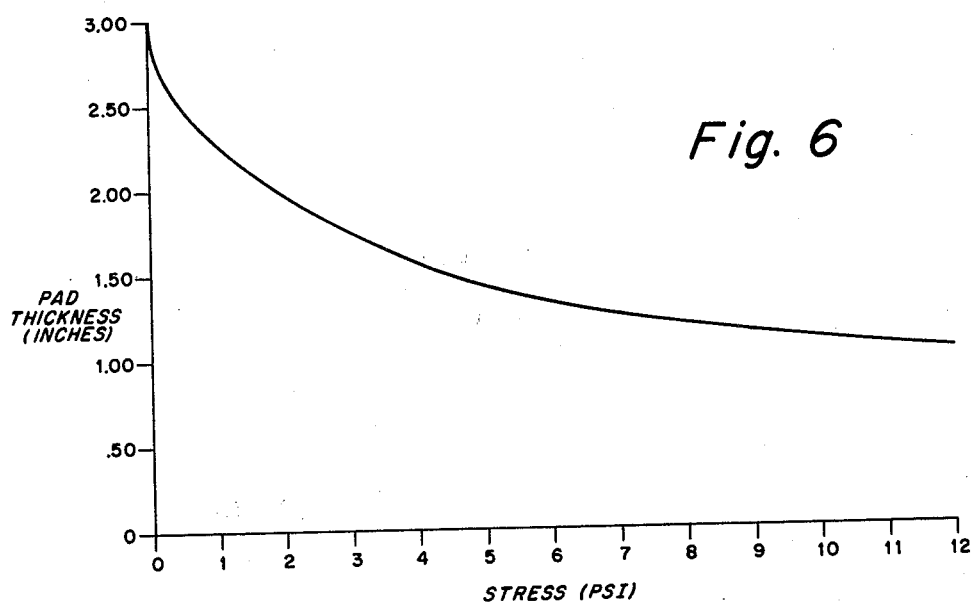
FIG. 6 is a graphical representation of the thickness vs. stress properties for laminated layers respectively comprising the exemplary elastic materials referred to in FIG. 5.

In an embodiment constructed in accordance with the invention, one-inch elastomeric urethane foam layers 13, 14 and 15 were chosen having stress vs. deformation properties approximately as shown in FIG. 5. Of course, it is understood that FIGS. 5 and 6 are merely exemplary, and that the scope of the invention is not limited to any material or composition having these particular properties except to the extent set forth in the appended claims. It will be observed that layer 13 has a relatively low elastic bulk modulus or high compressibility, and layers 14 and 15 have low moduli or high compressibility at progressively higher and overlapping ranges of loads. When these layers are combined, the resultant thickness vs. stress property approximates the curve shown in FIG. 6 wherein deformations at low stresses are largely influenced by layer 13, and deformations at progressively higher stresses are respectively influenced by the layers 14 and 15. As in this example, it will be observed that the layers 13, 14 and 15 were each selected with a separate and distinct compressibility range so that layer 14 begins to deform when the layer 13 has reached a point of substantial maximum deformation. Similarly, layer 15 deforms after layer 14. By the appropriate selection of layer materials, this concept is useful not only for extending the range of stress but for matching the resilient pad 12 to the non-linear load distribution. Vibration damping for given frequencies is also possible by choosing layer materials consonant with vibration damping theory for systems of springs in series.

It is further contemplated in the present invention that the layer materials be inherently resistant to sudden impact. For example, in certain urethane foams, the interstitial cellular construction thereof will permit restricted air flow between adjacent cells. Gradually applied forces produce deformation, but suddenly applied forces are met by substantially inelastic resistance because the air is unable to flow and permit cellular deformation.

FIG. 3 shows structural adapters with appropriate mounting bolt holes included therein for positively securing the couch 10 in an aero-space vehicle. Obviously many variations in structural brackets and adapters may be selected instead of those shown without departing from the fundamental inventive concepts.

Many advantages should now be apparent from the foregoing description of the invention. One, however, cannot be left for any amount of conjecture. That is, the invention extends man's physiological capabilities in aero-space flights by providing a substantial improvement in the acceleration protective art. Whereas custom-fitted couches were previously required, a contoured couch is now available which can accept a wide range of physical sizes and configurations in pilots with no requirement for equipment substitution. This is particularly desirable in training devices and passenger transport where the size and physical characteristics of future occupants cannot be anticipated, or when a scheduled pilot must be replaced by his "backup" pilot on very short notice before an aero-space flight. In prolonged aero-space flights involving several men, a change of their duties and therefore positions in the space vehicle, can be effected without equipment substitution or degradation of performance abilities caused by ill-fitting restraint couches. It should also be apparent that high stress concentrations known as "pressure points" caused by protrusions other than of the body are relieved. For example, the present invention will readily conform to various pieces of hardware such as buckles, snaps, electrical and hose connectors, and biomedical electrodes and still provide residual resilience between the occupant and the rigid shell 10.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A universal-fit acceleration protective contoured couch for supporting and restraining a human occupant subjected to a high acceleration environment, the occupant being from a group having a wide range of physical sizes and configurations, comprising:

a rigid shell substantially contoured into a hollow relief of the head, back and posterior of the occupant in a prescribed posture and of sufficient depth so as to provide complete support laterally and longitudinally to the occupant, the relief being uniformly larger than the corresponding portions of the occupant;

a uniformly thick resilient pad intimately secured to the entire relief surface of said shell for providing substantially contiguous support to the confronting body portions of the occupant, the shape of the head, back and posterior portions of said pad being contoured to the body of the occupant, said pad having a plurality of uniformly thick layers of elastic foam secured to each other at the interfaces and air-permeable therebetween, and an omnidirectional elastic slip lining intimately secured to the otherwise exposed surface of said pad, the layer closest to the confronting body portions having a relatively low elastic bulk modulus throughout a low range of loads and progressively farther removed layers having high resistance at low loads and low moduli throughout progressively higher and overlapping ranges of loads, and said layers being selected with respect to each other for maximum damping of preselected vibration frequencies; and a structural adapter mounted on the exposed surface of said shell for positively securing said couch in an aero-space vehicle;

whereby the occupant's physiological tolerance in aero-space flight are greatly enhanced.

2. A universal-fit acceleration protective contoured couch for supporting and restraining a human occupant subjected to a high acceleration environment, the occupant being from a group having a wide range of physical sizes and configurations, comprising:

a rigid shell substantially contoured into a hollow relief of the head, back and posterior of the occupant in a prescribed posture and of sufficient depth so as to provide complete support laterally and longitudinally to the occupant, the relief being uniformly larger than the corresponding portions of the occupant; and a uniformly thick resilient pad intimately secured to the entire relief surface of said shell for providing substantially contiguous support to the confronting body portions of the occupant, the shape of the head, back and posterior portions of said pad being contoured to the body of the occupant, said pad having a plurality of layers secured to each other at the interfaces and air-permeable therebetween, the layer closest to the confronting body portions having a relatively low elastic bulk modulus throughout a low range of loads and progressively farther removed layers having high resistance at low loads and low moduli throughout progressively higher and overlapping ranges of loads;

whereby the occupant's physiological tolerance in aerospace flight are greatly enhanced.

3. A universal-fit acceleration protective contoured couch for supporting and restraining a human occupant subjected to a high acceleration environment, the occupant being from a group having a wide range of physical sizes and configurations, comprising:

a rigid shell generally contoured into a hollow relief of a body portion of the occupant in a prescribed posture and of sufficient depth so as to provide complete support laterally and longitudinally to the occupant, the relief being uniformly larger than the corresponding portion of the occupant; and a resilient pad of a plurality of layers each uniformly thick intimately secured to the entire inside surface of said shell for providing substantially contiguous support to the confronting body portion of the occupant, the shape of the head, back and posterior portions of said pad being contoured to the body of the occupant, the pad composition closest to the confronting body portion having a relatively low compressive resistance throughout a low range of loads and progressively farther removed compositions having high resistance at low loads and low compressive resistance throughout progressively higher and overlapping ranges of loads;

whereby the occupant's physiological tolerance in aerospace flight is greatly enhanced.

References Cited by the Examiner
UNITED STATES PATENTS

| | | | |
|---|---|---|---|
| 2,764,228 | 9/56 | Donohue | 297—457 |
| 2,780,350 | 2/57 | Simon et al. | |
| 2,823,393 | 2/58 | Baldine | 5—344 |
| 2,831,532 | 4/58 | Kasper | 5—361 |
| 2,870,053 | 1/59 | Marc | 5—361 |
| 2,892,489 | 6/59 | Hurley | 297—457 |
| 2,878,153 | 3/59 | Hacklander | 5—347 |
| 2,971,640 | 2/61 | Snelling. | |
| 2,981,317 | 4/61 | Cartwright | 297—452 |
| 3,001,824 | 9/61 | Weiner | 297—460 |
| 3,038,175 | 6/62 | Faget | 5—345 |
| 3,047,888 | 8/62 | Shecter et al. | 5—361 |
| 3,051,601 | 8/62 | Schick | 5—361 |

FOREIGN PATENTS 268    1892    Great Britain.

FRANK B. SHERRY, *Primary Examiner.*